(12) United States Patent
Sinnott et al.

(10) Patent No.: US 10,824,265 B2
(45) Date of Patent: Nov. 3, 2020

(54) METHOD AND SYSTEM FOR AN ELECTRONIC DEVICE

(71) Applicant: Cirrus Logic International Semiconductor Ltd., Edinburgh (GB)

(72) Inventors: Edward Veitch Sinnott, East Lothian (GB); Nicholas Jeremy Skinner, Hampshire (GB); Jonathan Taylor, London (GB); Nigel Burgess, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/282,759

(22) Filed: Feb. 22, 2019

(65) Prior Publication Data

US 2019/0265831 A1 Aug. 29, 2019

Related U.S. Application Data

(60) Provisional application No. 62/634,330, filed on Feb. 23, 2018.

(30) Foreign Application Priority Data

Sep. 26, 2018 (GB) .................................. 1815675.2

(51) Int. Cl.
*G06F 3/041* (2006.01)
*G06F 9/451* (2018.01)
*G06F 1/3231* (2019.01)
*G06K 9/00* (2006.01)

(52) U.S. Cl.
CPC .......... *G06F 3/0416* (2013.01); *G06F 1/3231* (2013.01); *G06F 9/453* (2018.02); *G06K 9/00013* (2013.01); *G06F 2203/04101* (2013.01)

(58) Field of Classification Search
None
See application file for complete search history.

(56) References Cited

U.S. PATENT DOCUMENTS

| | | | |
|---|---|---|---|
| 9,353,965 B1* | 5/2016 | Goyal | G06F 3/011 |
| 2006/0161871 A1 | 7/2006 | Hotelling et al. | |
| 2011/0157040 A1 | 6/2011 | Kashio | |
| 2015/0052476 A1 | 2/2015 | Nakao | |
| 2018/0114047 A1* | 4/2018 | Kim | G06K 9/00026 |

FOREIGN PATENT DOCUMENTS

| | | |
|---|---|---|
| EP | 3032385 A1 | 6/2016 |
| EP | 3312752 A1 | 4/2018 |
| WO | 2011161310 A1 | 12/2011 |
| WO | 2016133602 A1 | 8/2016 |
| WO | 2017132258 A1 | 8/2017 |

OTHER PUBLICATIONS

Combined Search and Examination Report under Sections 17 and 18(3), UKIPO, Application No. GB1815675.2, dated Jan. 9, 2019.

* cited by examiner

*Primary Examiner* — Aneeta Yodichkas
(74) *Attorney, Agent, or Firm* — Jackson Walker, L.L.P.

(57) ABSTRACT

An operating method for an electronic device comprising the steps of: monitoring a far-field proximity sensor of the electronic device for far-field detection of a user approach; responsive to said far-field detection, monitoring a near-field proximity sensor of the electronic device for near-field detection of a user approach; and responsive to said far-field detection and/or said near-field detection, providing a visual indication of an interaction zone for the electronic device.

18 Claims, 6 Drawing Sheets

METHOD AND SYSTEM FOR AN ELECTRONIC DEVICE

The present disclosure claims priority to U.S. Provisional Patent Application Ser. No. 62/634,330, filed Feb. 23, 2018, and United Kingdom Patent Application No. 1815675.2, filed Sep. 26, 2018, each of which is incorporated by reference herein in its entirety.

FIELD OF THE INVENTION

The present invention relates to a method and system for the operation of an electronic device, in particular a method and system for facilitating interaction with an electronic device. The present invention also relates to electronic devices configured to operate in accordance with such a method and system.

BACKGROUND OF THE INVENTION

It is known to provide electronic devices, such as mobile phones or cell phones, with ultrasonic wake-on-approach technology to detect an approaching object. This can be used to perform multiple device operations, e.g. pause/play music etc.

Figure 1:
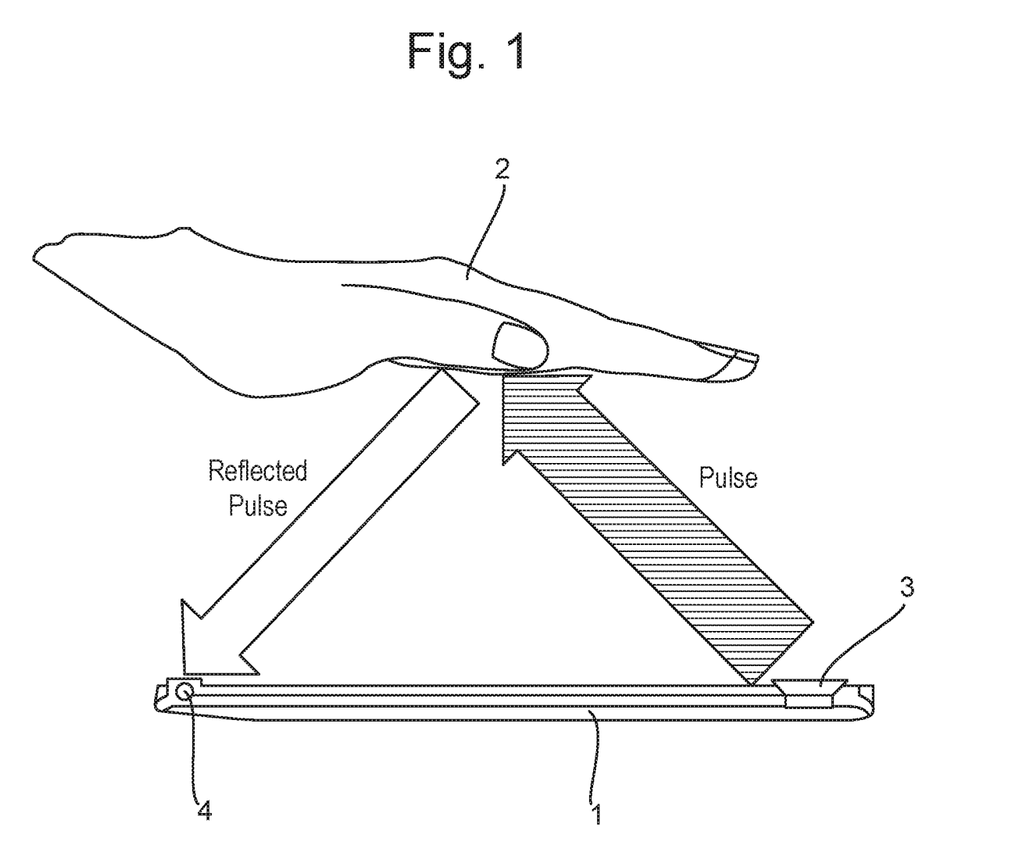
FIG. 1, as mentioned above, shows an example of ultrasonic wake on approach functionality.

FIG. 1 shows an example in relation to such a device 1, in this case a mobile phone. An approaching object 2, in this case a user hand, can be detected using ultrasonic pulses which travel from a device speaker 3 to a waiting microphone 4. As a hand or other object 2 approaches the device 1 the ultrasonic pulses reflect off the approaching object 2 back to the microphone 4 on the device 1. Once the approach of an object 2 is detected, the device 1 can be woken from an inactive or low-power sleep state. This may be referred to as an ultrasonic wake on approach functionality.

It is desirable to provide systems and methods for electronic devices which facilitate improved ease of user operation, and which allow for intuitive interaction with the device systems and sensors. It is desirable to provide electronic devices which enable intuitive user interaction with systems and sensors of the device while controlling and preferably reducing power consumption.

SUMMARY OF THE INVENTION

Accordingly, there is provided an operating method for an electronic device comprising the steps of: monitoring a proximity sensor of the electronic device to detect a user approach, preferably an approach of a user finger; and responsive to said detection, providing a visual indication of an interaction zone for the electronic device.

By displaying a visual indication of an interaction zone to a user, the user is presented with a clear direction of how to interact with the device. By only activating the visual indication when it is detected that a user is approaching the device, accordingly the power consumption of the device is reduced.

An interaction zone can be understood as an area for allowing initial user interaction with the device, e.g. to instruct activation or unlocking of the device. Such a zone may be the location of a sensor to allow for device unlocking. Preferably, such a zone is indicative of the location of a sensor such as a fingerprint sensor for fingerprint-based unlocking of a device, but it will be understood that the location of other systems for interaction with a device may be indicated by the visual indication of interaction zone, e.g. the location of a camera for an optics-based interaction with or unlocking of the device, or the location of wireless sensors such as RFID or NFC sensors, e.g. for the scanning or reading of RFID or NFC tags.

Preferably, the step of monitoring comprises: performing an ultrasonic proximity detection.

Ultrasonic proximity detection provides a relatively simple and robust method of detecting user approach to a device, and which is largely unobtrusive.

Preferably, the step of performing an ultrasonic proximity detection comprises: transmitting an ultrasonic signal, preferably using a speaker of the electronic device; monitoring for the reflection of ultrasonic signal from a proximate object, preferably using a microphone of the electronic device; and responsive to detecting a reflection of the ultrasonic signal at the electronic device, determining that a user or an object is proximate to or approaching the electronic device.

Preferably, the electronic device comprises a touch-screen display, wherein the step of providing a visual indication comprises indicating on a touch-screen display of the device the location of an unlock area for the device.

For electronic devices having unlock areas or unlock devices integrated into the display of the device, or located beneath the surface of the display, it can be difficult for a user to easily see where an unlock operation is to be performed. This can present a particular challenge in the case of a discrete fingerprint sensor provided as an in-display or sub-surface fingerprint sensor, where there is no physical indication of the location of the sensor itself. Accordingly, by providing a visual indication as to the location of the sensor, the user is guided to the correct location on the display for interaction with the sensor.

Preferably, the unlock area comprises the location of a fingerprint sensor, for example a sub-surface fingerprint sensor or an in-display fingerprint sensor.

The visual indication may be an arrow or other directional indicator of the presence of an unlock zone, or may be a graphical representation of an associated sensor or technology, e.g. a graphical representation of a fingerprint for a fingerprint sensor, a graphical representation of a wireless tag for an RFID or NFC sensor, a graphical representation of an eye or a camera for an optics-based sensor, etc.

Preferably, the electronic device comprises a display and an associated display driver arranged to drive the display to display visual information, wherein the method comprises the step of: responsive to said detection, instructing the display driver to drive the display to provide a visual indication of an interaction zone for the electronic device.

In a preferred embodiment, the display driver is coupled with a memory module, wherein the memory module stores display data which, when provided as an input to the display driver, is configured to generate a pre-determined visual indication on the associated display.

The pre-determined visual indication can be configured to be specific to the location of a defined interaction zone and/or a defined location of a sensor on the device. By providing the display driver with access to memory with such stored display data, accordingly the display driver can be initialised and generate the desired visual indication on the display without waiting for display instructions to be generated and/or received from a separate module, e.g. from an applications processor, thereby reducing the power and latency requirements of the overall system.

In one aspect of the invention, the device may comprise multiple sensors, wherein the visual indication provides an indication of the locations of respective sensors of the device.

In an aspect of the invention, the electronic device comprises an interaction module, preferably a fingerprint sensor, wherein the method further comprises the step of: responsive to said detection, activating the interaction module from an inactive or low-power sleep state.

When the device detects that a user is approaching the device, the system can act to initialise interaction modules, such as fingerprint sensors, to start monitoring for user input. Such a power gating of the interaction modules of the device provides improved overall power consumption, as the modules are only initialised when needed.

Preferably, the step of activating the interaction module comprises initialising a fingerprint sensor, preferably an in-display or sub-surface fingerprint sensor.

In a further aspect, the method further comprises the steps of: responsive to said detection, generating an interrupt command for an application processor, to activate the applications processor from an inactive or low-power sleep state.

To facilitate low power consumption for the electronic device, the device applications processor (AP), which may be a relatively high-power component, can be maintained in an inactive or low-power sleep state until needed. If the proximity detection acts to detect the approach of a user, this may be an indication that a user intends to interact with the device, and accordingly the AP can be initialised. While in one approach the AP may be fully initialised based on the proximity detection, in an alternative approach the AP may only be fully initialised based on receipt of further user input, e.g. as a result of the user unlocking the device.

Preferably, said step of generating an interrupt command is performed in parallel with said step of providing a visual indication.

By generating the interrupt to the AP at the same time that the visual indication is displayed, accordingly any latency is reduced between the user approaching the device and the visual indication being displayed on the device display.

There is also provided an electronic device comprising a controller, the controller configured to implement the steps of the above-described method. The electronic device is preferably provided as a mobile phone or cell phone, but it will be understood that other devices may be configured to implement the steps of the above method, e.g. a tablet computer or a display-enabled smart appliance. Other example devices are mentioned later herein.

The electronic device preferably comprises a proximity sensor system and a display arranged to implement the steps of the above method.

In one aspect, the controller may be implemented as part of a wake-on-approach module configured to activate the device from an inactive or low-power sleep state as a result of a proximity detection. It will be understood that the wake-on-approach module may be provided as a standalone circuit module, or may be provided as part of a multi-purpose circuit module, for example as part of a CODEC such as an audio CODEC.

There is further provided an electronic device comprising: a display screen; a fingerprint sensor, preferably provided underlying an area of the display screen; a proximity detector, preferably configured to provide a detection signal on detecting the approach of a finger; and display driver circuitry, preferably configured to initiate display of a visual cue in the area of the display screen in response to receiving the detection signal.

In a further aspect, there is provided an electronic device comprising: a display screen; a fingerprint sensor, preferably positioned underlying an area of the display screen; a proximity detector, preferably configured to provide a detection signal on detecting the approach of a finger; and display driver circuitry, preferably configured to initiate display of a visual cue in response to receiving the detection signal, said visual cue indicating an area of the display screen for user interaction.

The area of the display for user interaction may comprise an area for fingerprint sensing, e.g. an area where a user should place his finger or thumb. The visual cue may comprise arrows pointing to an area, or an illumination of the actual area.

There is further provided a method of fingerprint verification comprising: detecting the approach of a finger of a user; and on detection of approach, initiating display of a visual cue in a portion of the area of a display screen overlying a fingerprint sensor.

Preferably, on detection of approach, activating circuitry to detect contact of a finger on the screen above the sensor.

On detection of contact, the method comprises: activating the fingerprint sensor to provide fingerprint data; and performing a verification of the provided fingerprint data by comparison against reference fingerprint data of a registered user.

In a further aspect, there is provided a method of fingerprint sensing comprising: detecting the approach of a finger of a user; and on detection of approach, initiating display of a visual cue in a portion of the area of a display screen overlying a fingerprint sensor, and activating the fingerprint sensor to provide fingerprint data corresponding to the finger on effective contact to the area of the display screen.

In a further aspect, there is provided an operating method for an electronic device comprising the steps of: monitoring a far-field proximity sensor of the electronic device for far-field detection of a user approach; responsive to said far-field detection, monitoring a near-field proximity sensor of the electronic device for near-field detection of a user approach; and responsive to said far-field detection and/or said near-field detection, providing a visual indication of an interaction zone for the electronic device.

In a further aspect, there is provided an operating method for an electronic device comprising the steps of: monitoring a far-field proximity sensor of the electronic device for far-field detection of a user approach; monitoring a near-field proximity sensor of the electronic device for near-field detection of a user approach; and responsive to determining that said far-field detection has been followed by said near-field detection, providing a visual indication of an interaction zone for the electronic device.

Further details are provided at the end of the description in the form of statements and clauses which are useful for understanding the present invention.

BRIEF DESCRIPTION OF THE DRAWINGS

Reference will now be made, by of example only, to the accompanying drawings, of which.

DETAILED DESCRIPTION

By utilising proximity detection systems such as ultrasonic proximity detection to devices, it is possible to add additional layers to phone interaction, object detection, etc. It is particularly advantageous to provide interaction as an object approaches to give a visual aid to a user.

Figure 2A:
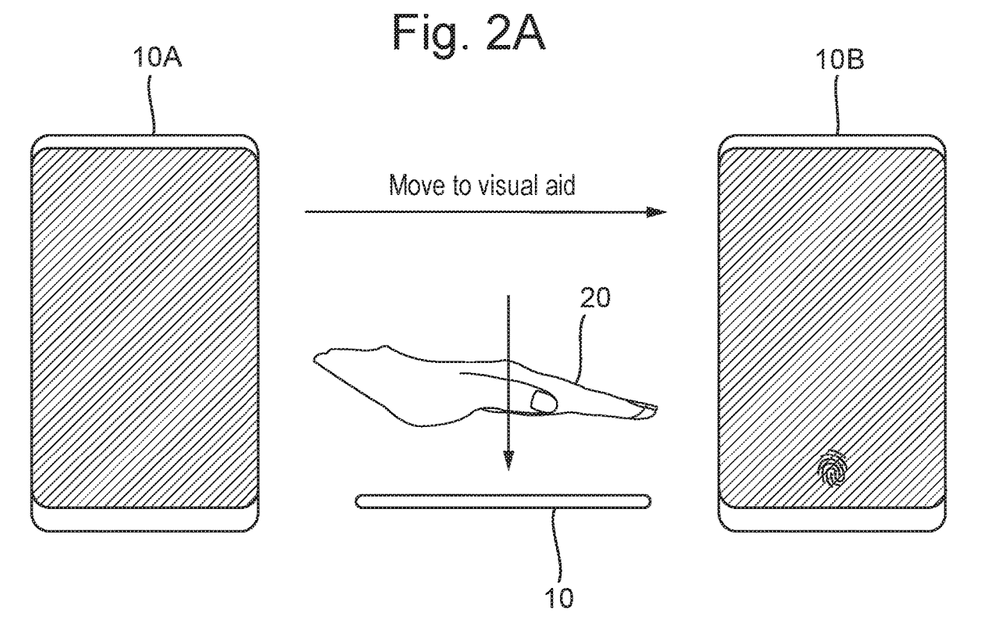
FIG. 2A is a schematic diagram, useful for understanding one possible implementation of the present invention.

FIG. 2A is a schematic diagram, useful for understanding one possible implementation of the present invention.

In the centre of FIG. 2A, a hand is pictured as an example of a user object 20 and a mobile telephone is pictured, in side profile, as an example of an electronic device 10.

Other example user entities or objects 20 include a finger or thumb, a palm, an eye and a face, and also an identification tag or card or image (such as a barcode). Other example electronic devices 10 include an audio player, a video player, a PDA, a mobile computing platform such as a laptop computer or tablet, a games device, a television, and a so-called "smart" device (such as a smart speaker). The present disclosure will be understood accordingly, and the present example involving a hand and mobile telephone will be carried forward simply as a convenient running example.

Also indicated in FIG. 2A are two example plan views 10A, 10B of the mobile telephone 10, showing the touchscreen display in two corresponding circumstances. Essentially, as the hand approaches the mobile telephone 10 as indicated in the centre of FIG. 2A by the downward arrow, the touchscreen display changes what it is displaying from the left-hand view 10A to the right-hand view 10B as indicated by the left-to-right arrow between those views.

In this case the movement of a hand 20 towards a phone 10 results in the display of a fingerprint guide on the phone, showing the user where they can use their own finger to unlock the phone. This is one such example where an object 20 (user object) moving towards a screen or device 10 can be used as a trigger for the appearance of a visual aid for the end user.

In this case, the visual aid identifies the location on the touchscreen where the user can apply its finger to make use of an in-display or sub-surface fingerprint sensor. It will be appreciated that in this case (and similar cases) the location of the sensor may not be visually identified for the user in the absence of the visual aid. The visual aid itself (representing a fingerprint—see view 10B) also informs the user as to the type of identification to be carried out—i.e. fingerprint verification. Of course, other visual aids could be used for other types of sensor and corresponding verification, such as retina scanning using a suitable sensor (with the visual aid e.g. being a picture of an eye).

The mobile telephone 10 is thus configured to carry out an operating method, in which it monitors a proximity sensor (of the mobile telephone) to detect a user approach, and, responsive to the detection, provides a visual indication of an interaction zone (in this case, the location of the in-display or sub-surface fingerprint sensor).

In this example, it is intended that the visual aid be displayed as the hand 20 approaches the mobile telephone 10, i.e. before it actually makes contact with the mobile telephone and even before it comes within a given distance of the mobile telephone (for example within the sensing range of a capacitive touch sensor or another close-range sensor). In this way, the user will have the experience that the approach has been detected "early" and that, where e.g. the mobile telephone 10 is in a locked or other initial state, the user is being directed or guided towards the or one of the locations (interaction zones) where the user can interact with the mobile telephone to e.g. unlock it. Further, the visual aid (in the case of FIG. 2A, the fingerprint image) need not be provided (i.e. displayed) until the approach is detected, saving power in relation to the driving of the touchscreen (and activating or waking up elements of the device for operating the fingerprint sensor) for example. For example, when the mobile telephone 10 is locked the touchscreen could be (or appear to be) powered off or in a sleep state.

The form of approach detection employed in FIG. 2A could for example be ultrasonic proximity detection, in line with FIG. 1. A speaker and a microphone of the mobile telephone 10 could in that case cooperate to detect the approach of the hand (or finger, i.e. the user object). A speaker of the mobile telephone 10 could act as both the speaker and microphone. That is, the mobile telephone 10 may be equipped to detect the distance of the hand from the mobile telephone and/or the location of the hand relative to the mobile telephone. As another example, the output transceiver used to generate the ultrasonic signals could include a surface audio or acoustic surface system—i.e. using the screen (e.g. touchscreen) of the mobile telephone (device) 10 to generate and emit the ultrasonic signals (i.e. acting as a loudspeaker).

Figure 2B:
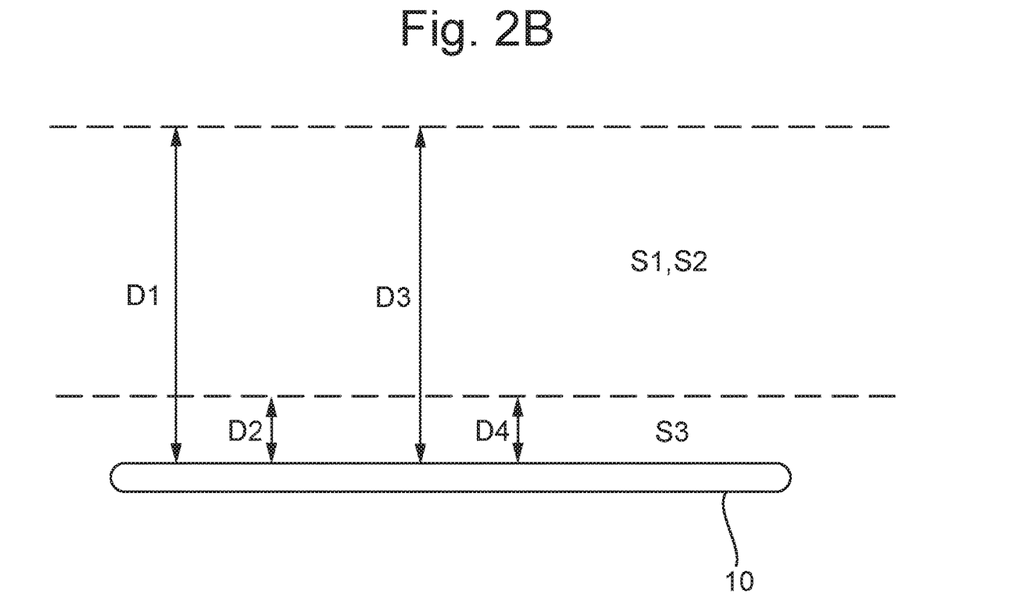
FIG. 2B is a schematic diagram, useful for further understanding the FIG. 2A implementation.

FIG. 2B is a schematic diagram similar to that of FIG. 2A, useful for understanding that the mobile telephone 10 may be operable to effectively track the approach of the hand 20 (not shown in FIG. 2B), in terms of its location relative to the mobile telephone 10 or simply its distance from the mobile telephone 10.

In some arrangements, detecting the user approach involves detecting when the hand 20 approaches within a distance D1 of the mobile telephone and/or when the user object enters a space S1 relative to the mobile telephone 10. Thus, the approach may be detected relatively-early on, i.e. before the hand 20 comes into contact with the mobile telephone 10. For example, the hand 20 may be detected when it is less than the distance D1 and greater than a distance D2 from the electronic device, where D1>D2>X. The value X here may be 0 or a value which defines the sensing range of a capacitive touch sensor or another close-range sensor. As another example, the hand may be detected when it is in the space S1, where the space S1 is separated from the electronic device (enough to be just beyond the sensing range of a capacitive touch sensor or another close-range sensor). It will be appreciated that ultrasonic proximity detection may be used to detect a distance or (e.g. by triangulation using more than one source of ultrasonic pulses) a location.

In some arrangements, the mobile telephone 10 may employ different proximity sensors for different distances/locations of the hand 20. For example, the mobile telephone 10 may have first and second proximity sensors. The first proximity sensor may be used when the hand 20 is determined to be less than a distance D3 and greater than a distance D4 from the electronic device 10, i.e. when the hand 20 is relatively far from the mobile telephone 10, and the second proximity sensor may be used when the hand is determined to be less than the distance D4 from the electronic device 10, where D3>D4>X, i.e. when the hand 20 is relatively close to the mobile telephone 10. The value X here may be 0 or a value which defines the sensing range of the second proximity sensor. D3 and D4 may be equal to D1 and D2, respectively (as shown in FIG. 2B for convenience), but need not be. As another example, the first proximity sensor may be used when the user object 20 is determined to be in a space S2 relative to the electronic device 10, and the second proximity sensor may be used when the user object 20 is determined to be in a space S3 relative to the electronic device 10, where the space S2 is separated from the electronic device (enough to be just beyond the sensing range of the second proximity sensor) and where the space S3 is separated from or contiguous with the electronic device 10. The spaces S1 and S2 may be the same as one another (as shown in FIG. 2B for convenience), but need not be. The spaces S2 and S3 may be such that the hand is deemed to be closer to the intended interaction zone when it is in space S3 than when it is in space S2. Such spaces may be defined volumes relative to the mobile telephone 10.

The first proximity sensor may for example be an ultrasonic or other audio proximity sensor, for example comprising a speaker (including a surface audio or acoustic surface system) and microphone of the electronic device 10. Such a sensor may be suitable for detecting the approach of a hand when it is relatively far from (e.g. 2 to 20 cm from) the mobile telephone 10.

The second proximity sensor may for example be a capacitive proximity sensor, for example implemented by way of the touch interface of the touchscreen of the mobile telephone 10. Such a sensor may be suitable for detecting the approach of a hand when it is relatively close to (e.g. within 15 mm or even 5 mm of) the mobile telephone 10.

Of course, the mobile telephone 10 may be equipped with a camera, which could serve as an optical proximity sensor. Such a sensor could be used to detect either or both of the relatively far and near elements of the approach.

As mentioned above, the mobile telephone 10 may be operable to effectively track the approach of the hand 20. With this in mind, responsive to the detection, the provided visual indication may be changed dependent on the distance of the hand 20 from the mobile telephone 10 and/or the location of the hand 20 relative to the mobile telephone 10.

For example, the visual indication may be changed with changing distance of the hand 20 from the mobile telephone 10, or changing location of the hand 20 relative to the mobile telephone 10, or changing distance of the hand 20 from a given interaction zone for the mobile telephone 10, or changing location of the hand 20 relative to a given interaction zone for the mobile telephone 10, or any combination of these.

One example could be that, if the hand 20 is detected as approaching a part of the mobile telephone 10 other than the intended interaction zone (e.g. the location of the in-display or sub-surface fingerprint sensor), an arrow is displayed on the touchscreen to encourage the user to move the hand back towards the intended interaction zone. Another example could be that a series of rings centred on the intended interaction zone but decreasing in radius are shown one by one as the hand (or part thereof, such as a finger) 20 gets closer to that interaction zone, to give the impression of the visual indication zooming in on the interaction zone. In the case of FIG. 2A, such rings may need to be half rings so as to fit on the touchscreen display, although in principle the interaction zone could be in any location on the touchscreen (such as in the middle). Of course, these are just simple examples and other examples will occur to the skilled person.

In order to change the visual indication in this way, the mobile telephone 10 may be configured to continue to monitor the proximity sensor to detect the distance of the hand 20 from the mobile telephone 10 and/or the location of the hand 20 relative to the mobile telephone 10.

Where the mobile telephone 10 has a plurality of interaction zones, the visual indication may be configured to direct or guide the hand 20 to a given one of the interaction zones. For example, the mobile telephone 10 may be configured to select which one of the interaction zones to direct the hand 20 to based on one or more of an operating state of the mobile telephone 10 and a current location of the hand 20. As another example, where e.g. a user eye approaches the mobile telephone 10 instead of a hand, the visual indication may direct the user to locate the eye next to a retina scanner rather than next to the fingerprint sensor. Thus, the mobile telephone 10 may be configured to select which one of the interaction zones to direct the user object to based on the type of user object (palm, eye, finger, tag etc.) which approaches.

As above, the mobile telephone 10 may be controlled such that it is in a given initial state, such as being "locked". In this state, the mobile telephone may appear to be off in the sense that the touchscreen display may be blank or appear off (see view 10A in FIG. 2A). The mobile telephone 10 may carry out the monitoring for an approaching user object in this initial state. Thus, the visual indication may not be provided/displayed in this initial state and/or during the monitoring step (i.e. until the approach is detected). The mobile telephone 10 may transition from the initial state to a secondary state, when the approach is detected. The provision of the visual indication may occur in the secondary state, in which state one or more components of the electronic device 10 may be activated or woken up from a sleep state.

The mobile telephone 10 may comprise a display and an associated display driver arranged to drive the display to display visual information. The mobile telephone 10 (or a controller thereof) may be configured, responsive to the detection of the approach of a user object 20, to instruct the display driver to drive the display to provide the visual indication of an interaction zone for the mobile telephone 10.

Figure 3A:
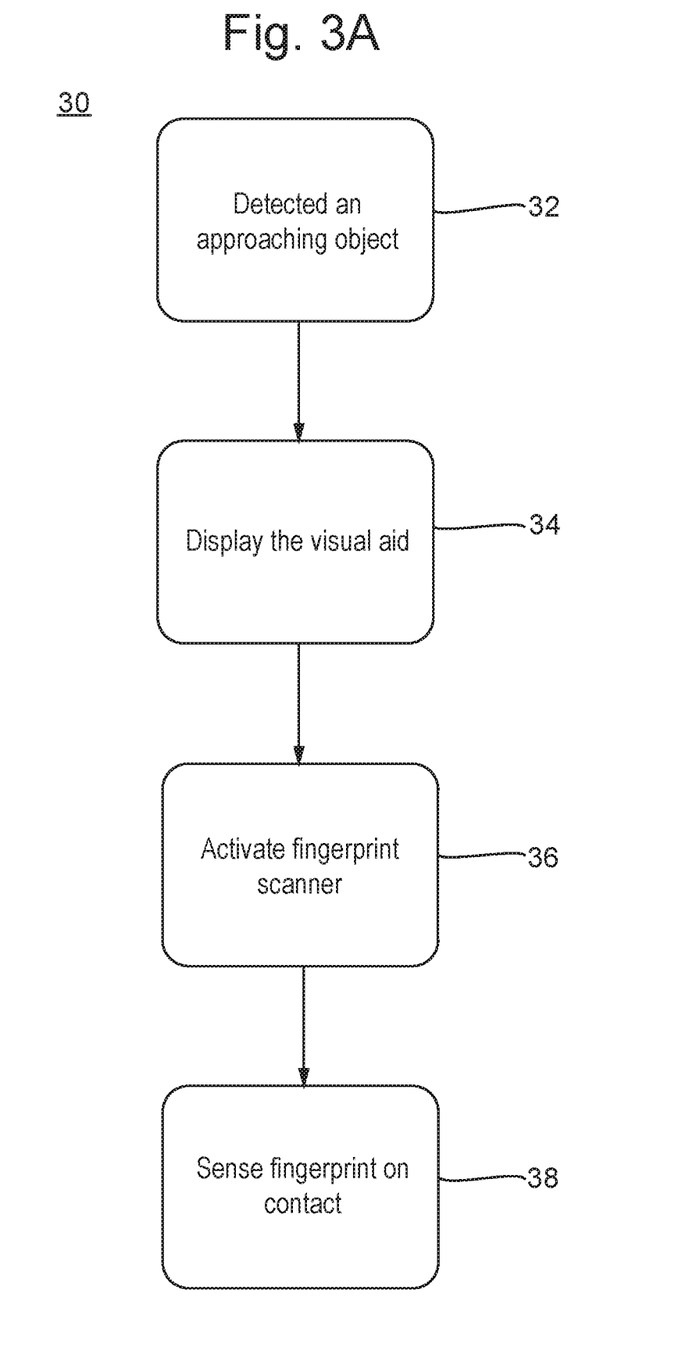
FIG. 3A is a flow diagram of a method which may be performed by an electronic device.

FIG. 3A is a flow diagram of a method 30 which may be performed by an electronic device 10, in line with the teachings here. The method 30 has been presented as a simple flow which uses the proximity of a hand/object 20 (i.e. a user object) to enable a visual indication to be provided (e.g. to enable an alternative or new screen display). The screen display is then used to guide the user to a certain area of the screen, following the running example in FIG. 2A, after which the fingerprint sensor or scanner can be enabled.

The method 30 of FIG. 3A may be performed e.g. by a controller of the electronic device, and comprises steps 32 to 38. In step 32, a proximity sensor of the electronic device 10 is monitored to detect a user approach. When the approach has been detected, the method 30 proceeds to step 34. In step 34, responsive to the detection, a visual indication of an interaction zone for the electronic device 10 is provided. The visual indication may be referred to as a visual aid, since it aids the user in interacting with the electronic device 10. In step 36, an interaction sensor (e.g. a fingerprint sensor or scanner) of the electronic device 10 is activated, having been in a low-power or off state beforehand, and in step 38 the interaction with the user is sensed (e.g. the fingerprint of the user is sensed and verified on contact of the user's finger with the relevant part of the electronic device 10).

It will be appreciated that steps 32, 34 and 36 may occur before the user makes contact with the electronic device 10, the electronic device 10 having been in an initial (e.g. locked) state. Step 32 may correspond to such an initial state, and that state may change to a secondary state upon leaving step 32. Steps 34 and 36 may for example be performed in parallel. Further, step 32 may be continued during performance of steps 34 and 36, in the sense of tracking the user object 20 (e.g. a hand or finger). Step 32 may involve detecting that a user object approach has breached or crossed a defined perimeter around the device (e.g. based on location or distance as described above in relation to FIG. 2B), and this breach may serve as the trigger for steps 34 and 36 (and transitioning from the initial state to the secondary state). Incidentally, although the boundaries (shown as dashed lines) defined by the distances and spaces (areas/volumes) indicated in FIG. 2B are shown as being parallel to one another and the touchscreen plane of the device 10 (i.e. flat), it may be that such boundaries are curved (non-flat) as defined by the ranges of respective sensors.

As mentioned above, in some arrangements the mobile telephone 10 may employ different proximity sensors (e.g. at least first and second proximity sensors) for different distances/locations of the hand 20. The mobile telephone 10 may be configured to determine whether a sequence of detections (by the respective different proximity sensors) has occurred and to take action based upon such a sequence of detections.

For example, the mobile telephone (electronic device) 10 may comprise a far-field proximity sensor and a near-field proximity sensor. The far-field proximity sensor may for example be an ultrasonic or other audio proximity sensor as mentioned earlier. Such a sensor may be suitable for detecting the approach of a hand when it is up to relatively far from (e.g. 2 to 20 cm from) the mobile telephone 10. The near-field proximity sensor may for example be a capacitive proximity sensor, for example implemented by way of the touch interface of the touchscreen of the mobile telephone 10 (configured to act as a near-field proximity sensor and a touch sensor, e.g. simultaneously or in corresponding different modes of operation) or by way of a capacitive proximity sensor separate from the touchscreen of the mobile telephone 10. Such a sensor may be suitable for detecting the approach of a hand when it is relatively close to (e.g. within 15 mm or even 5 mm of) the mobile telephone 10.

In some arrangements, therefore, the mobile telephone 10 may be configured to monitor the far-field proximity sensor for far-field detection of a user approach (e.g. approach of the hand 20), monitor the near-field proximity sensor for near-field detection of a user approach, and responsive to the far-field detection and/or the near-field detection, provide a visual indication of an interaction zone for the mobile telephone 10. For example, the monitoring of the near-field proximity sensor for near-field detection of a user approach may be carried out responsive to (e.g. initiated by) the far-field detection. As another example, the visual indication may be provided responsive to determining that the far-field detection has been followed by the near-field detection. That is, the method may comprise determining that the far-field detection has been followed by the near-field detection.

In this way, a sequence of detections acts as a trigger, in particular the far-field detection followed by the near-field detection in the present example. This sequence of detections may be determined to have occurred for example when the near-field detection occurs, where the monitoring of the near-field proximity sensor for near-field detection is carried out responsive to (e.g. initiated by) the far-field detection as above.

By virtue of the far-field proximity sensor detecting the hand 20 when it is relatively far from (and not touching) the mobile telephone 10, and the near-field proximity sensor detecting the hand 20 when it is relatively close to (but not touching) the mobile telephone 10, the hand 20 is effectively tracked as it gets closer to the mobile telephone 10. Advantageously, the near-field proximity sensor may be more accurate than the far-field proximity sensor leading to better tracking of the hand 20 when it becomes relatively close to the mobile telephone 10.

Different actions may be taken at different stages in the sequence of detections. That is, one action may take place at the beginning of the sequence, and another action may (only) take place if the complete sequence (or a given part of it) is detected.

The step of monitoring the near-field proximity sensor of the electronic device may be initiated responsive to the far-field detection as above. For example, responsive to the far-field detection, the near-field proximity sensor may be transitioned from a low-power sleep state to a woken state to perform the near-field detection. In this way, the near-field proximity sensor need not be in the woken state and consuming corresponding power all of the time.

As another example, a visual indication of an interaction zone (e.g. the location of the in-display or sub-surface fingerprint sensor) may be provided on the touchscreen responsive to the far-field detection, e.g. in the form of a ring centred on the intended interaction zone with a relatively large radius continuing the example provided earlier.

Then, responsive to the near-field detection, or the far-field detection followed by the near-field detection, the visual indication could be updated, e.g. by providing a new ring (in addition to or instead of the existing ring) centred on the intended interaction zone but with a relatively small radius.

As another example, responsive to the far-field detection, or the near-field detection or the far-field detection followed by the near-field detection, a display driver and/or display of the mobile telephone 10 may be transitioned from a low-power sleep state to a woken state in order to provide the visual indication on the touchscreen. Thus, such waking up may occur at different stages in the sequence of detections depending on the application.

The far-field proximity sensor and/or the near-field proximity sensor may provide position information of the position of the approaching hand 20 (user object). As above, such information from the near-field proximity sensor may be more accurate than from the far-field sensor. The visual indication of the interaction zone may be updated based on the position information. For example, the visual indication may be changed (e.g. reducing the radius of a displayed ring as mentioned earlier, to indicate a closing proximity to the interaction zone). As another example, the visual indication may cease to be provided when the position of the approaching hand 20 gets within a threshold distance of the interaction zone, to indicate that proximity within the threshold distance has been achieved.

As above, the touchscreen may serve as a touch sensor separate from the far-field proximity sensor and the near-field proximity sensor. That is, the far-field proximity sensor and the near-field proximity sensor may be for detecting the approach before the user hand 20 (user object) actually touches the mobile telephone (device) 10. In contrast, the touchscreen or another touch sensor may be for detecting when the user hand 20 (user object) actually touches the mobile telephone (device) 10, or at least when the user hand 20 comes so close as to be detected by the touch sensor as touching the mobile telephone (device) 10.

The mobile telephone (device) 10 may be configured to monitor the touch sensor for touch detection of a user touch of the device. For example, the touch detection could be considered a third element in the sequence: far-field detection, then near-field detection, then touch detection.

The monitoring of the touch sensor could be initiated responsive to the far-field detection and/or the near-field detection, for example after the two-step sequence of far-field detection followed by near-field detection. The touch sensor may be transitioned from a low-power sleep state to a woken state to perform the touch detection responsive to the far-field detection or the near-field detection, for example after the two-step sequence of far-field detection followed by near-field detection. Further, the visual indication of the interaction zone could be updated responsive to the touch detection. As before, this could involve changing the visual indication or ceasing to provide the visual indication.

It will be apparent that the far-field detection and/or the near-field detection may correspond to or involve detecting a distance of the user hand 20 (user object) from the mobile telephone (device) 10 and/or a location of the hand 20 relative to the mobile telephone (device) 10.

Figure 2C:
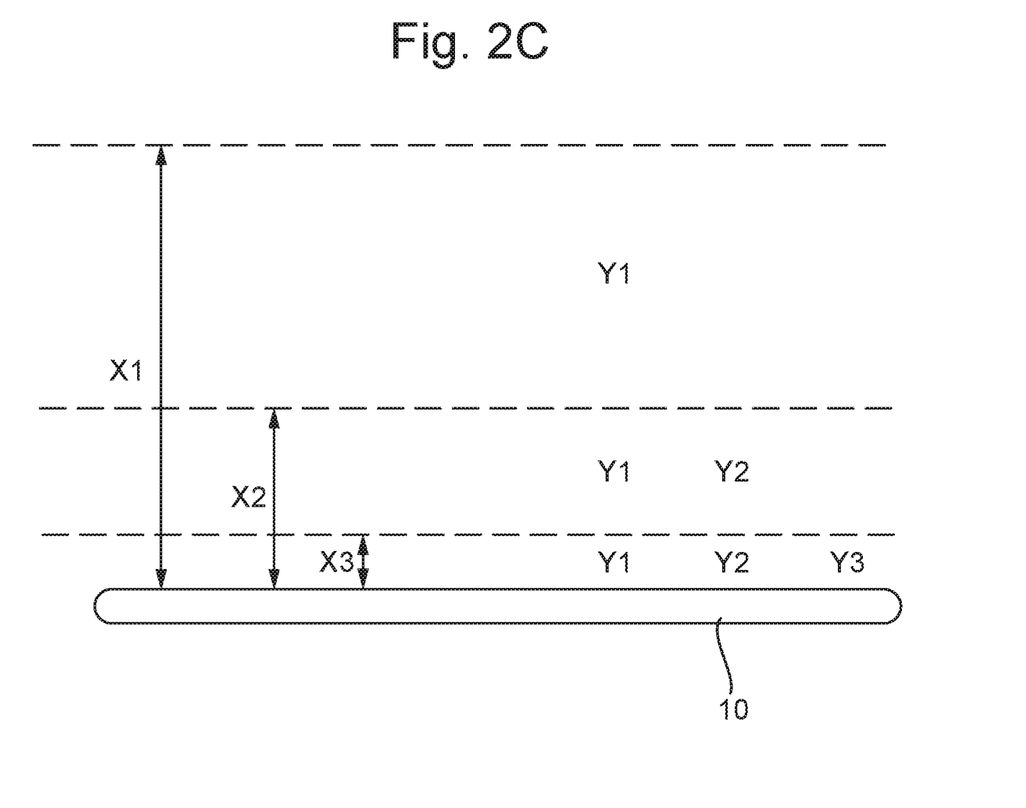
FIG. 2C is a schematic diagram, useful for further understanding the FIG. 2A implementation.

FIG. 2C is a schematic diagram similar to that of FIG. 2B, useful for understanding that the mobile telephone 10 may be operable to effectively track the approach of the hand 20 (not shown in FIG. 2C), in terms of a sequence of detections.

In some arrangements, detecting the user approach involves using the far-field detector to detect when the hand 20 approaches within a distance X1 of the mobile telephone and/or when the user object enters a space Y1 relative to the mobile telephone 10, this constituting far-field detection. In some arrangements, detecting the user approach involves using the near-field detector to detect when the hand 20 approaches within a distance X2 of the mobile telephone and/or when the user object enters a space Y2 relative to the mobile telephone 10, this constituting near-field detection. Here, X1>X2>0 and the space Y2 is within the space Y1 as in FIG. 2C.

Thus, the approach may be detected relatively-early on, i.e. before the hand 20 comes into contact with the mobile telephone 10, with the far-field detector and the near-field detector. Moreover, by determining that the far-field detection has been followed by the near-field detection, a sequence of detections is looked for which corresponds to the hand 20 getting closer to the interaction zone.

There may also be a distance X3 and a space Y3 which correspond to the touch detection range of a touch sensor such as a touchscreen of the mobile telephone 10. Here, X1>X2>X3≥0 and the space Y3 (which in some arrangements is so small as to have substantially zero volume) is within the space Y2 as in FIG. 2C.

Figure 3B:
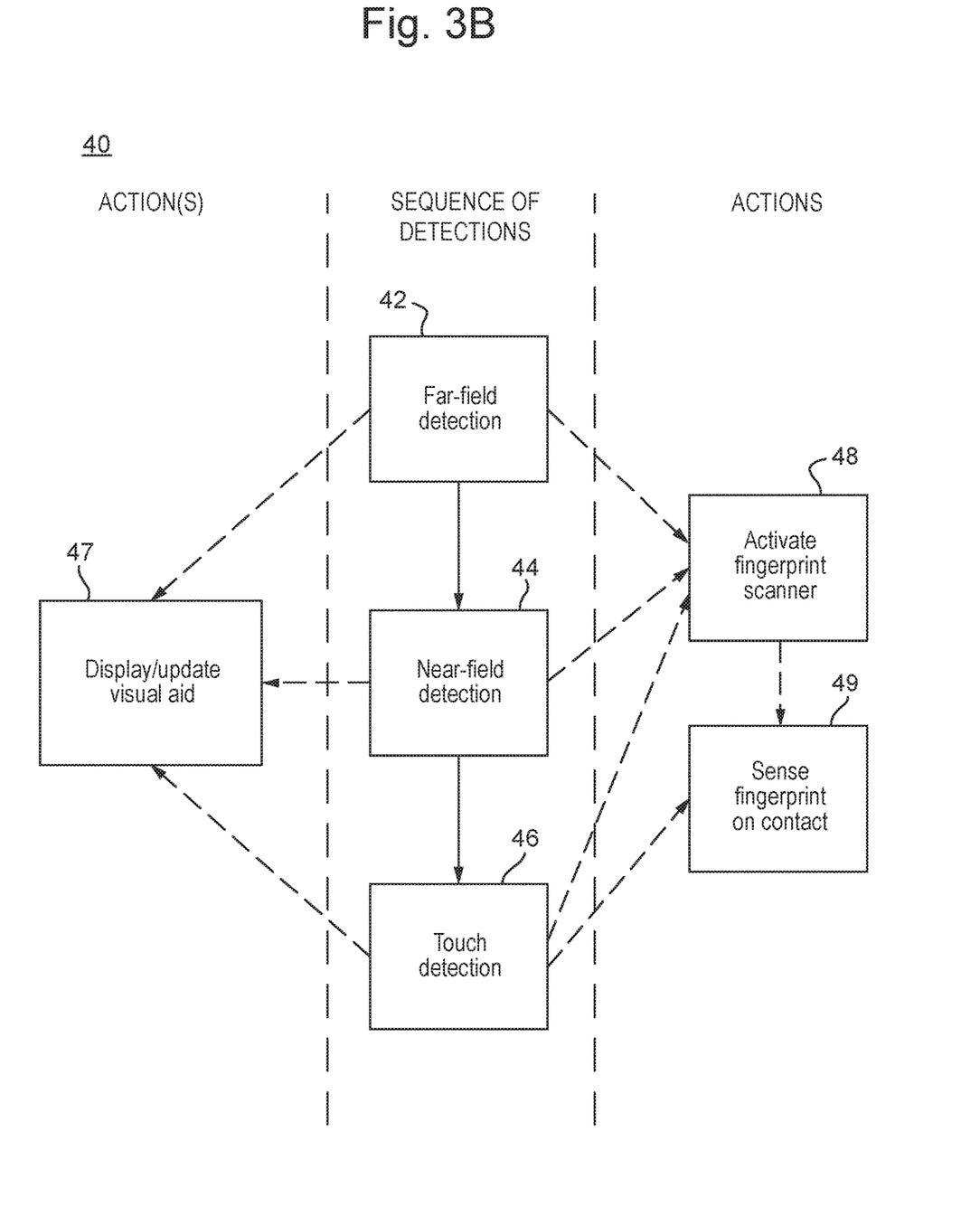
FIG. 3B is a flow diagram of a method which may be performed by an electronic device.

FIG. 3B is a flow diagram of a method 40 which may be performed by an electronic device 10. The method 40 has been presented in a similar fashion to method 30 described earlier, but focusses on using a sequence of detections to trigger actions. Similar to method 30, the proximity of a hand/object 20 (i.e. a user object) is used to enable a visual indication to be provided (e.g. to enable an alternative or new screen display). The screen display (in particular, the display of the visual aid or visual indication) is used to guide the user to a certain area of the screen, following the running example in FIG. 2A. Also, the fingerprint sensor or scanner is enabled and used.

The method 40 may be performed e.g. by a controller of the electronic device, and comprises steps 42, 44, 46, 47, 48 and 49.

In step 42 a far-field proximity sensor of the electronic device 10 is monitored for far-field detection of a user approach, in step 44 a near-field proximity sensor of the electronic device 10 is monitored for near-field detection of a user approach, and in step 46 a touch sensor of the electronic device 10 is monitored for touch detection of a user approach.

All three sensors may be monitoring from the outset. A more power efficient option may be for the near-field proximity sensor to start its monitoring after the far-field detection of step 42, and/or for the touch sensor to start its monitoring after the near-field detection of step 44. That is, the near-field proximity sensor may be woken up from a low-power sleep state to start its monitoring after (or in response to) the far-field detection of step 42, and/or the touch sensor may be woken up from a low-power sleep state to start its monitoring after (or in response to) the near-field detection of step 44.

The detections 42 and 44 thus constitute a sequence of detections. Similarly, the detections 42, 44 and 46 constitute a sequence of detections. Based on any of these detections, or based on part or all of a sequence of detections, other actions may be carried out and examples are provided in FIG. 3B.

For example, any one of these detections, or sequences of detections, may cause a visual aid to be displayed or updated on the touchscreen of the mobile telephone 10 in step 47, as already explained. Any one of these detections, or sequences of detections, may cause a display controller and/or display to be woken up from a low-power sleep state, e.g. without waking up a higher-level application controller.

As another example, any one of these detections, or sequences of detections, may cause a fingerprint scanner to be activated in step 48, e.g. woken up from a low-power sleep state, e.g. without waking up a higher-level application controller. The touch detection in step 46 may trigger the sensing of a fingerprint using the fingerprint scanner in step 49.

As another example (not shown in FIG. 3B), any one of these detections, or sequences of detections, may be used as a trigger to wake up elements of the mobile telephone 10 from a low-power sleep state, including a higher-level application controller.

It will be appreciated that steps 42 and 44 (and any of steps 47 and 48 triggered by steps 42 and 44) may occur before the user makes contact with the electronic device 10, the electronic device 10 having been in an initial (e.g. locked) state. Step 42, or steps 42 and 44, may correspond to such an initial state, and that state may change to a secondary state upon leaving step 42 or 44.

For example, the mobile telephone 10 may be controlled such that it is in a given initial state (which may be considered a sleep or locked state). The step of monitoring the far-field proximity sensor may be carried out while the mobile telephone 10 is in the initial state. It may be that the visual indication is not provided in the initial state. When the mobile telephone 10 is in the initial state and the user approach is detected with the far-field detection in step 42, or the near-field detection in step 44, or the far-field detection followed by the near-field detection in steps 42 and 44, the mobile telephone 10 may be transitioned into a secondary state. The visual indication may be provided in step 47 when the mobile telephone 10 is in the secondary state and/or upon transitioning the mobile telephone 10 into the secondary state. When the mobile telephone 10 is in the secondary state and/or upon transitioning the mobile telephone 10 into the secondary state, one or more components of the mobile telephone 10 may be activated or woken up.

For example, responsive to the far-field detection 42, or the near-field detection 44, or the far-field detection 42 followed by the near-field detection 44, an interrupt command for an application processor of the mobile telephone 10 may be generated, to activate the application processor from an inactive or low-power sleep state. The interrupt may be generated in parallel with providing a visual indication or aid in step 47.

Thus, mobile telephones 10 (or, more generally, electronic devices) in accordance with this disclosure may comprise one or more controllers, the controllers and/or the device as a whole configured to implement any of the methods described herein.

Figure 4:
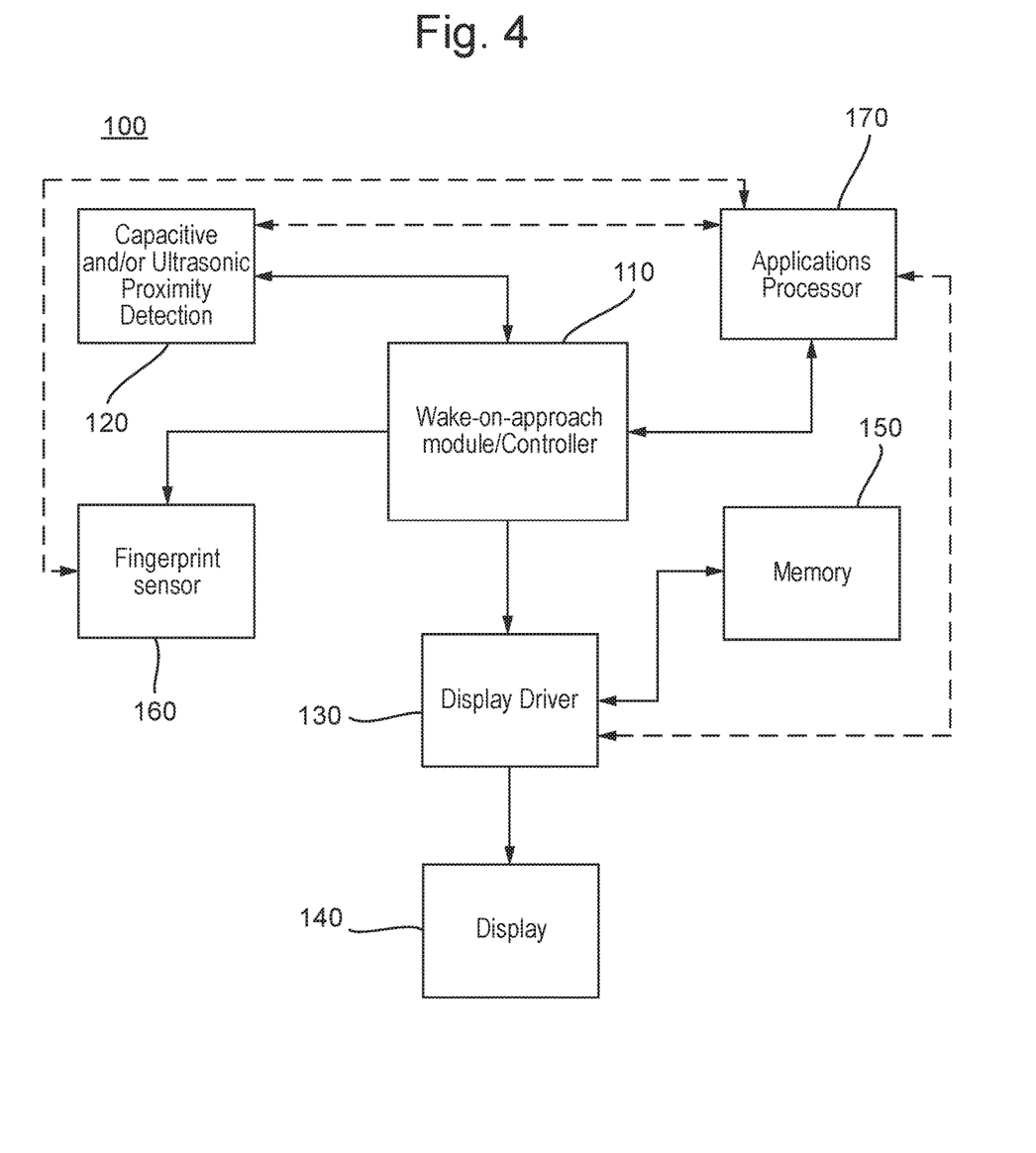
FIG. 4 is a schematic diagram of a system, for use in an electronic device.

FIG. 4 is a schematic diagram of a system 100, for use in an electronic device 10. The system 100 may be considered to represent part of all of such an electronic device 10.

The system 100 comprises a central controller 110, a proximity detection system 120, a display driver 130, a display 140, memory storage 150, a fingerprint sensor 160, and an applications processor 170.

The central controller 110 is provided, in this arrangement, as part of a "wake-on-approach" module. The "wake-on-approach" module may be provided as a standalone component, or may be provided as part of a multi-purpose component, e.g. as part of an audio CODEC. The controller 110 is coupled with the proximity detection system 120, in this arrangement comprising an ultrasonic proximity detection system (far-field proximity sensor) and for example a capacitive proximity detection system (near-field proximity sensor).

On detection of an approaching user object 20 (hand/finger), e.g. in line with FIG. 3A or FIG. 3B, the controller 110 is configured to instruct the display driver 130 to generate a visual indication on the device display 140, where the visual indication is of an interaction zone for the electronic device 10. The term "interaction zone" may be understood as an unlock zone for the device 10, and/or the location of a fingerprint sensor in the device 10, for example if the fingerprint sensor is provided as an in-display or sub-surface sensor the location of which is not immediately apparent to the user.

The display driver 130 is coupled with memory storage 150, the display driver 130 configured to access this memory 150 to retrieve display data which is used to generate an appropriate visual indication for the location of the interaction zone for the device 10.

In parallel to instructing the display driver 130 to generate a visual indication for the display 140, or at another time triggered by a detection or sequence of detections e.g. in line with FIG. 3B, the controller 110 is configured to initialise a fingerprint sensor 160 of the device, from an inactive or low-power sleep state. Additionally or alternatively, in parallel to instructing the display driver 130 to generate a visual indication for the display 140, or at another time triggered by a detection or sequence of detections e.g. in line with FIG. 3B, the controller 110 is configured to send an interrupt command to the device applications processor (AP) 170, to initialise the AP 170 of the device from an inactive or low-power sleep state. It will be understood that once the AP 170 is initialised, the AP 170 may assume control of one or more of the other elements of the system 100, e.g. the display driver 130, the fingerprint sensor 160, etc.

By initialising the fingerprint sensor 160 and/or the AP 170 in parallel to generate the visual indication of the interaction zone, accordingly the device is configured for fast wake of the device 10 from standby.

As an alternative approach, the controller 110 may send an interrupt to the AP 170 in response to the detection of an approaching user (e.g. a far-field detection or a near-field detection), wherein the AP 170 is configured to initialise the display driver 130 to provide the visual indication on the display 140.

In an alternative aspect of the invention, the ultrasonic proximity detection system 120 may output a measure of the proximity distance to the detected user, and wherein the initialisation of the various elements of the system 100 shown in FIG. 4 may be performed as a function of the detected proximity distance. For example, the controller 110 may be configured to instruct the visual indication when the proximity distance is less than (i.e. just less than, or becomes less than) distance D1 from the electronic device, and further configured to initialise the fingerprint sensor 160 and/or the AP 170 when the proximity distance is less than (i.e. just less than, or becomes less than) distance D2 from the electronic device, where D1>D2 (see FIG. 2B). Similarly, the initialisation or controlling of each or any of the various elements may take place based on a detection or sequence of detections e.g. in line with the general teaching of FIG. 3B.

The display 140 preferably comprises a display such as an LED or OLED display, which is arranged to have the fingerprint sensor 160 arranged within or underneath the display 140. Such a sensor 160 is configured to detect fingerprints applied to the surface of the display 140.

The present invention thus extends to an electrical or electronic device 10, which may be considered a host device. Such devices include an audio player, a video player, a PDA, a mobile telephone or smart phone, a mobile computing platform such as a laptop computer or tablet, a games device, a television, and a so-called "smart" device (such as a smart speaker).

The skilled person will recognise that some aspects or parts of the above described apparatus (circuitry) and methods may be embodied as processor control code, for example on a non-volatile carrier medium such as a disk, CD- or DVD-ROM, programmed memory such as read only memory (Firmware), or on a data carrier such as an optical or electrical signal carrier. For example, the configuration unit may be implemented as a processor operating based on processor control code.

For some applications, such aspects will be implemented on a DSP (Digital Signal Processor), ASIC (Application Specific Integrated Circuit) or FPGA (Field Programmable Gate Array). Thus the code may comprise conventional program code or microcode or, for example, code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communication with one another. Where appropriate, such aspects may also be implemented using code running on a field-(re)programmable analogue array or similar device in order to configure analogue hardware.

A circuit or circuitry according to an embodiment of the present invention (for example, a controller configured to perform a method described herein) may be implemented as an integrated circuit (IC), for example on an IC chip. One or more input or output transducers (e.g. sensors) may be connected to the integrated circuit in use.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope.

The invention is not limited to the embodiments described herein, and may be modified or adapted without departing from the scope of the present invention.

In summary, there is described a method and system for an electronic device. The method and system monitors a proximity detection system for the device, and generates a visual indication of how to interact with the device in response to detecting the approach of a user or an object such as a finger.

The present disclosure extends to the following statements, which are useful for understanding the present invention.

S1. An operating method for an electronic device comprising the steps of:
  monitoring a proximity sensor of the electronic device to detect a user approach, preferably an approach of a user finger; and
  responsive to said detection, providing a visual indication of an interaction zone for the electronic device.

S2. The method of statement S1, wherein the step of monitoring comprises:
  performing an ultrasonic proximity detection.

S3. The method of statement S2, wherein the step of performing an ultrasonic proximity detection comprises:
  transmitting an ultrasonic signal, preferably using a speaker of the electronic device;
  monitoring for the reflection of ultrasonic signal from proximate object, preferably using a microphone of the electronic device; and
  responsive to detecting a reflection of the ultrasonic signal at the electronic device, determining that a user or an object is proximate to or approaching the electronic device.

S4. The method of statement S1, wherein the electronic device comprises a touch-screen display, wherein the step of providing a visual indication comprises indicating on a touch-screen display of the device the location of an unlock area for the device.

S5. The method of statement S1, wherein the unlock area comprises the location of a fingerprint sensor, for example a sub-surface fingerprint sensor or an in-display fingerprint sensor.

S6. The method of statement S1, wherein the electronic device comprises a display and an associated display driver arranged to drive the display to display visual information, wherein the method comprises the step of:
  responsive to said detection, instructing the display driver to drive the display to provide a visual indication of an interaction zone for the electronic device.

S7. The method of statement S6, wherein the display driver is coupled with a memory module, wherein the memory module stores display data which, when provided as an input to the display driver, is configured to generate a pre-determined visual indication on the associated display.

S8. The method of statement S1, wherein the device comprises multiple sensors, wherein the visual indication provides an indication of the locations of respective sensors of the device.

S9. The method of statement S1, wherein the electronic device comprises an interaction module, preferably a fingerprint sensor, wherein the method further comprises the step of:
  responsive to said detection, activating the interaction module from an inactive or low-power sleep state.

S10. The method of statement S9, wherein the step of activating the interaction module comprises initialising a fingerprint sensor, preferably an in-display or sub-surface fingerprint sensor.

S11. The method of statement S1, wherein the method further comprises the steps of:
  responsive to said detection, generating an interrupt command for an application processor, to activate the applications processor from an inactive or low-power sleep state.

S12. The method of statement S11, wherein said step of generating an interrupt command is performed in parallel with said step of providing a visual indication.

S13. An electronic device comprising a controller, the controller configured to implement the steps of the method of statement S1.

S14. The electronic device of statement S13, wherein the device is provided as a mobile phone or cell phone.

S15. The electronic device of statement S13, wherein the electronic device comprises a proximity sensor system and a display arranged to implement the steps of the above method, preferably an LED display or an OLED display.

S16. The electronic device of statement S13, wherein the controller is implemented as part of a wake-on-approach module configured to activate the device from an inactive or low-power sleep state as a result of a proximity detection.

S17. An electronic device comprising:
  a display screen;
  a fingerprint sensor, preferably provided underlying an area of the display screen;
  a proximity detector, preferably configured to provide a detection signal on detecting the approach of a finger; and
  display driver circuitry, preferably configured to initiate display of a visual cue in the area of the display screen in response to receiving the detection signal.

S18. An electronic device comprising:
  a display screen;
  a fingerprint sensor, preferably positioned underlying an area of the display screen;
  a proximity detector, preferably configured to provide a detection signal on detecting the approach of a finger; and
  display driver circuitry, preferably configured to initiate display of a visual cue in response to receiving the detection signal, said visual cue indicating an area of the display screen for user interaction.

S19. A method of fingerprint verification comprising:
  detecting the approach of a finger of a user; and
  on detection of approach,
    initiating display of a visual cue in a portion of the area of a display screen overlying a fingerprint sensor.

S20. A method of fingerprint sensing comprising:
  detecting the approach of a finger of a user; and
  on detection of approach,
    initiating display of a visual cue in a portion of the area of a display screen overlying a fingerprint sensor, and activating the fingerprint sensor to provide fingerprint data corresponding to the finger on effective contact to the area of the display screen.

The present disclosure also extends to the following clauses, which are useful for understanding the present invention.

X1. An operating method for an electronic device comprising the steps of:
  monitoring a proximity sensor of the electronic device to detect a user approach; and
  responsive to said detection, providing a visual indication of an interaction zone for the electronic device.

X2. The method of clause X1, wherein detecting the user approach comprises detecting the approach of a user object.

X3. The method of clause X2, wherein the user object comprises:
  a user finger; or a user hand; or a user eye; or a user identification tag.

X4. The method of clause X2 or X3, wherein detecting the user approach comprises detecting the distance of the user object from the electronic device and/or the location of the user object relative to the electronic device.

X5. The method of any of clauses X2 to X4, wherein detecting the user approach comprises detecting when the user object approaches within a distance D1 of the electronic device and/or when the user object enters a space S1 relative to the electronic device.

X6. The method of clause X5, wherein detecting the user approach comprises detecting when the user object is:
  less than the distance D1 and greater than a distance D2 from the electronic device, where D1>D2>0, optionally wherein D2 defines the sensing range of a capacitive proximity sensor of the electronic device such as a touchscreen; and/or
  in the space S1, where the space S1 is separated from the electronic device, optionally wherein the space S1 is outside the sensing range of a capacitive proximity sensor of the electronic device such as a touchscreen.

X7. The method of clause X6, wherein the monitoring a proximity sensor of the electronic device comprises:
  monitoring a first proximity sensor when the user object is determined to be less than a distance D3 and greater than a distance D4 from the electronic device, and monitoring a second proximity sensor when the user object is determined to be less than or equal to the distance D4 from the electronic device, where D3>D4>0, optionally wherein D4 defines the sensing range of the second proximity sensor; and/or
  monitoring the first proximity sensor when the user object is determined to be in a space S2 relative to the electronic device, and monitoring the second proximity sensor when the user object is determined to be in a space S3 relative to the electronic device, where the space S2 is separated from the electronic device and where the space S3 is separated from or contiguous with the electronic device, optionally wherein the space S2 is outside the sensing range of the second proximity sensor.

X8. The method of clause X7, wherein:
  the first proximity sensor comprises an ultrasonic or other audio proximity sensor, optionally comprising a speaker and microphone of the electronic device or a surface audio or acoustic surface system of the electronic device; and/or
  the second proximity sensor comprises a capacitive proximity sensor, optionally comprising a touchscreen of the electronic device; and/or
  the first or second proximity sensor comprises an optical proximity sensor, optionally comprising a camera of the electronic device.

X9. The method of any of clauses X2 to X8, wherein the step of providing a visual indication comprises, responsive to the detection, changing the provided visual indication dependent on the distance of the user object from the electronic device and/or the location of the user object relative to the electronic device.

X10. The method of clause X9, wherein the step of providing a visual indication comprises, responsive to the detection, changing the provided visual indication to indicate one or more of:
  a changing distance of the user object from the electronic device;
  a changing location of the user object relative to the electronic device;
  a changing distance of the user object from a given interaction zone for the electronic device; and
  a changing location of the user object relative to a given interaction zone for the electronic device.

X11. The method of any of clauses X2 to X9, comprising, while providing the visual indication, continuing to monitor the proximity sensor to detect the distance of the user object from the electronic device and/or the location of the user object relative to the electronic device.

X12. The method of any of clauses X2 to X11, wherein the electronic device has a plurality of interaction zones, the method comprising providing the visual indication to direct or guide the user object to a given one of the interaction zones.

X13. The method of clause X12, comprising selecting which one of the interaction zones to direct the user object to based on one or more of:
  an operating state of the electronic device;
  a current location of the user object; and
  the type of user object concerned.

X14. The method of any of the preceding clauses, comprising the step of:
  controlling the electronic device such that it is in a given initial state,
  wherein the method comprises carrying out the step of monitoring while the electronic device is in the given initial state.

X15. The method of clause X14, comprising, when the electronic device is in the initial state and/or during said monitoring step, not providing the visual indication.

X16. The method of clause X14 or X15, comprising:
  when the electronic device is in the initial state and the user approach is detected, transitioning the electronic device into a secondary state; and
  carrying out the step of providing a visual indication when the electronic device is in the secondary state and/or upon transitioning the electronic device into the secondary state.

X17. The method of clause X16, comprising:
  when the electronic device is in the secondary state and/or upon transitioning the electronic device into the secondary state, activating or waking up or controlling one or more components of the electronic device.

X18. The method of clause X17, wherein the one or more components of the electronic device comprise one or more of:
  a processor or controller;
  a display;
  a display driver;
  an audio system;

a power controller;
a power domain;
a communications interface;
an input and/or output transducer, such as a sensor, optionally a fingerprint sensor; and
a memory unit.

X19. The method of any of the preceding clauses, wherein the step of monitoring comprises:
performing an ultrasonic proximity detection.

X20. The method of clause X19, wherein the step of performing an ultrasonic proximity detection comprises:
transmitting an ultrasonic signal, preferably using a speaker of the electronic device or a surface audio or acoustic surface system of the electronic device;
monitoring for the reflection of the ultrasonic signal from a proximate object, preferably using a microphone of the electronic device; and
responsive to detecting a reflection of the ultrasonic signal at the electronic device, determining that a user or an object is proximate to or approaching the electronic device.

X21. The method of any of the preceding clauses, wherein the electronic device comprises a touch-screen display, and wherein the step of providing a visual indication comprises indicating on the touch-screen display of the electronic device the location of a particular area of the electronic device.

X22. The method of clause X21, wherein the particular area of the electronic device is an area of the touch-screen display.

X23. The method of clause X21 or X22, wherein the particular area of the electronic device is an unlock area of the electronic device.

X24. The method of clause X23, wherein the unlock area comprises the location of a fingerprint sensor, for example a sub-surface fingerprint sensor or an in-display fingerprint sensor.

X25. The method of any of the preceding clauses, wherein the electronic device comprises a display and an associated display driver arranged to drive the display to display visual information, wherein the method comprises the step of:
responsive to said detection, instructing the display driver to drive the display to provide the visual indication of an interaction zone for the electronic device.

X26. The method of clause X25, wherein the display driver is coupled with a memory module, and wherein the memory module stores display data which, when provided as an input to the display driver, is configured to generate a pre-determined visual indication on the associated display.

X27. The method of any of the preceding clauses, wherein the electronic device comprises multiple sensors, and wherein the visual indication provides an indication of the location of one or more of the sensors of the device or a selected one of the sensors of the device.

X28. The method of any of the preceding clauses, wherein the electronic device comprises an interaction module, preferably a fingerprint sensor, and wherein the method further comprises the step of:
responsive to said detection, activating the interaction module from an inactive or low-power sleep state.

X29. The method of clause X28, wherein the step of activating the interaction module comprises initialising a fingerprint sensor, preferably an in-display or sub-surface fingerprint sensor.

X30. The method of any of the preceding clauses, wherein the method further comprises the steps of:
responsive to said detection, generating an interrupt command for an application processor, to activate the applications processor from an inactive or low-power sleep state.

X31. The method of clause X30, wherein said step of generating an interrupt command is performed in parallel with said step of providing a visual indication.

X32. The method of any of the preceding claims, wherein:
the electronic device is configured such that the or at least one said interaction zone is not visibly identified to the user in the absence of providing the visual indication; and/or
the electronic device comprises a touchscreen and a separate user-interaction sensor mounted under or within the touchscreen so as to define the interaction zone on the touchscreen, wherein the user-interaction sensor is operable to sense user interaction at the interaction zone; and/or
the visual indication is provided as an image displayed on the touchscreen, optionally at or adjacent to said location on the touchscreen; and/or
the user-interaction sensor is a fingerprint sensor; and/or
the method comprises activating the user-interaction sensor in response to detecting the user approach, optionally in parallel with providing the visual indication.

X33. An electronic device comprising a controller, the controller and/or the electronic device configured to implement the method of any of the preceding clauses.

X34. The electronic device of clause X33, being a mobile phone or cell phone or smart speaker or PDA or tablet or laptop or portable device.

X35. The electronic device of clause X33 or X34, wherein the electronic device comprises a proximity sensor system and a display arranged to implement the steps of the above method, preferably an LED display or an OLED display.

X36. The electronic device of any of clauses X33 to X35, wherein the controller is implemented as part of a wake-on-approach module configured to activate the device from an inactive or low-power sleep state as a result of a proximity detection.

X37. An electronic device, comprising:
a display screen;
a fingerprint sensor, provided underlying an area of the display screen;
a proximity detector, configured to provide a detection signal on detecting the approach of a finger; and
display driver circuitry, configured to initiate display of a visual cue in the area of the display screen in response to receiving the detection signal.

X38. An electronic device comprising:
a display screen;
a fingerprint sensor, positioned underlying an area of the display screen;
a proximity detector, configured to provide a detection signal on detecting the approach of a finger; and
display driver circuitry, configured to initiate display of a visual cue in response to receiving the detection signal, said visual cue indicating an area of the display screen for user interaction.

X39. A method of fingerprint verification comprising:
detecting the approach of a finger of a user; and
on detection of approach, initiating display of a visual cue in a portion of the area of a display screen overlying a fingerprint sensor.

X40. A method of fingerprint sensing comprising:
detecting the approach of a finger of a user; and
on detection of approach, initiating display of a visual cue in a portion of the area of a display screen overlying a fingerprint sensor, and activating the fingerprint sensor to provide fingerprint data corresponding to the finger on effective contact to the area of the display screen.

X41. An electronic device, comprising:
a controller;
a proximity sensor;
a touchscreen; and
a fingerprint sensor mounted under or within the touchscreen so as to define an interaction zone on the touchscreen at which the fingerprint sensor is operable to sense a user fingerprint,
wherein the controller is operable to:
control the electronic device such that it is in a given initial state, wherein in the initial state the touchscreen does not provide a given visual indication of the interaction zone;
while the electronic device is in the given initial state, control the proximity sensor to detect the approach of a user object, wherein the approach is detected when the user object is less than a distance D1 and greater than a distance D2 from the electronic device, where D1>D2>0, and/or in a space S1 which is separated from the electronic device; and
responsive to said detection, transition the electronic device into a secondary state and in that secondary state control the touchscreen to provide the given visual indication of the interaction zone.

X42. An electronic device, comprising:
a processor;
a controller separate from the processor;
a proximity sensor;
a display; and
a display driver for driving the display,
wherein the controller is operable to:
control the electronic device such that it is in a given initial state, wherein in the initial state the processor and the display driver are in a low-power sleep state;
while the electronic device is in the given initial state, monitor the proximity sensor to detect the approach of a user object, wherein the approach is detected when the user object is less than a distance D1 and greater than a distance D2 from the electronic device, where D1>D2>0, and/or in a space S1 which is separated from the electronic device; and
responsive to said detection, transition the electronic device into a secondary state and in that secondary state transition the display driver into a woken state to display a given visual indication on the display without transitioning the processor into a woken state beforehand and/or without employing the processor to transition the display driver into its woken state.

X43. The electronic device as claimed in clause X42, wherein the controller is operable, when the electronic device has been transitioned into the secondary state, to transition the processor into its woken state in parallel with transitioning the display driver into its woken state.

Y1. An operating method for an electronic device comprising the steps of:
monitoring a far-field proximity sensor of the electronic device for far-field detection of a user approach;
monitoring a near-field proximity sensor of the electronic device for near-field detection of a user approach; and
responsive to said far-field detection and/or said near-field detection, providing a visual indication of an interaction zone for the electronic device.

Y2. The method of clause Y1, wherein:
said step of monitoring the near-field proximity sensor of the electronic device is initiated responsive to said far-field detection.

Y3. An operating method for an electronic device comprising the steps of:
monitoring a far-field proximity sensor of the electronic device for far-field detection of a user approach;
monitoring a near-field proximity sensor of the electronic device for near-field detection of a user approach; and
responsive to said far-field detection followed by said near-field detection, providing a visual indication of an interaction zone for the electronic device.

Y4. An operating method for an electronic device comprising the steps of:
monitoring a far-field proximity sensor of the electronic device for far-field detection of a user approach;
monitoring a near-field proximity sensor of the electronic device for near-field detection of a user approach;
determining that said far-field detection has been followed by said near-field detection; and
responsive to determining that said far-field detection has been followed by said near-field detection, activating or waking up or controlling one or more components of the electronic device.

Y5. The method of clause Y4, wherein:
said controlling one or more components of the electronic device comprises providing a visual indication of an interaction zone for the electronic device.

The invention claimed is:

1. An operating method for an electronic device comprising the steps of:
monitoring a far-field proximity sensor of the electronic device for far-field detection of a user approach;
responsive to said far-field detection, transitioning a near-field proximity sensor of the electronic device from a low-power sleep state to a woken state and monitoring said near-field proximity sensor for near-field detection of a user approach; and
responsive to said far-field detection and/or said near-field detection, providing a visual indication of an interaction zone for the electronic device.

2. The method of claim 1, wherein:
said step of providing a visual indication of an interaction zone for the electronic device is initiated responsive to said far-field detection; and
the method comprises updating the visual indication of an interaction zone for the electronic device responsive to said near-field detection, said updating optionally comprising changing the visual indication or ceasing to provide the visual indication.

3. The method of claim 1, wherein:
said step of providing a visual indication of an interaction zone for the electronic device is initiated responsive to said near-field detection.

4. The method of claim 1, wherein:
said step of providing a visual indication of an interaction zone for the electronic device comprises transitioning a display driver and/or display of the electronic device from a low-power sleep state to a woken state and providing the visual indication on the display of the electronic device.

5. The method of claim 1, wherein:
said far-field proximity sensor and/or said near-field proximity sensor provides position information of the position of an approaching user object; and
the method comprises updating the visual indication of an interaction zone for the electronic device based on the position information, said updating optionally comprising changing the visual indication or ceasing to provide the visual indication.

6. The method of claim 1, comprising:
monitoring a touch sensor of the electronic device for touch detection of a user touch of the device.

7. The method of claim 6, wherein:
said step of monitoring the touch sensor of the electronic device is initiated responsive to said far-field detection and/or said near-field detection.

8. The method of claim 6, comprising:
transitioning said touch sensor from a low-power sleep state to a woken state to perform said touch detection responsive to said far-field detection or said near-field detection.

9. The method of claim 6, comprising:
responsive to said touch detection, updating the visual indication of an interaction zone for the electronic device, said updating optionally comprising changing the visual indication or ceasing to provide the visual indication.

10. The method of claim 1, wherein detecting the user approach comprises detecting the approach of a user object such as a user finger.

11. The method of claim 10, wherein said far-field detection and/or said near-field detection comprises detecting a distance of the user object from the electronic device and/or a location of the user object relative to the electronic device.

12. The method of claim 10, wherein:
said far-field detection comprises detecting the user approach with the far-field proximity sensor while the user object is separated apart from the electronic device, optionally by a distance which is greater than a sensing range of the near-field proximity sensor for said near-field detection; and
said near-field detection comprises detecting the user approach with the near-field proximity sensor while the user object is separated apart from the electronic device, optionally by a distance which is greater than a sensing range of a touch sensor of the electronic device for touch detection.

13. The method of claim 10, wherein:
said far-field detection comprises detecting when the user object approaches within a distance X1 of the electronic device and/or when the user object enters a space Y1 relative to the electronic device; and
said near-field detection comprises detecting when the user object approaches within a distance X2 of the electronic device and/or when the user object enters a space Y2 relative to the electronic device,
where X1>X2>0 and/or where the space Y2 is within the space Y1.

14. The method of claim 1, wherein:
the far-field proximity sensor comprises an ultrasonic or other audio proximity sensor, optionally comprising a speaker and microphone of the electronic device or a surface audio or acoustic surface system of the electronic device; and/or
the near-field proximity sensor comprises a capacitive proximity sensor; and/or
the far-field proximity sensor or the near-field proximity sensor comprises an optical proximity sensor, optionally comprising a camera of the electronic device.

15. The method of claim 1, comprising:
controlling the electronic device such that it is in a given initial state;
carrying out the step of monitoring the far-field proximity sensor while the electronic device is in the given initial state;
when the electronic device is in the initial state, not providing the visual indication;
when the electronic device is in the initial state and the user approach is detected with said far-field detection or said near-field detection, transitioning the electronic device into a secondary state;
carrying out the step of providing a visual indication when the electronic device is in the secondary state and/or upon transitioning the electronic device into the secondary state; and
when the electronic device is in the secondary state and/or upon transitioning the electronic device into the secondary state, activating or waking up or controlling one or more components of the electronic device.

16. The method of claim 1, wherein:
the electronic device comprises a touch-screen display, and wherein the step of providing a visual indication comprises indicating on the touch-screen display the location of an unlock area of the electronic device, which unlock area comprises the location of a fingerprint sensor, for example a sub-surface fingerprint sensor or an in-display fingerprint sensor; or
the electronic device comprises an interaction module, and wherein the method further comprises the step of responsive to said far-field detection or said near-field detection, activating the interaction module from an inactive or low-power sleep state, optionally wherein the step of activating the interaction module comprises initialising a fingerprint sensor, preferably an in-display or sub-surface fingerprint sensor; or
the method comprises determining that said far-field detection has been followed by said near-field detection, and, responsive to determining that said far-field detection has been followed by said near-field detection, activating or waking up or controlling one or more components of the electronic device.

17. The method of claim 1, wherein the method further comprises the step of:
responsive to said far-field detection or said near-field detection, generating an interrupt command for an application processor, to activate the application processor from an inactive or low-power sleep state,
optionally wherein said step of generating an interrupt command is performed in parallel with providing a visual indication of an interaction zone for the electronic device.

18. An electronic device comprising a controller, the controller and/or the electronic device configured to implement the method of claim 1.

* * * * *